United States Patent
Pang

(10) Patent No.: US 10,159,103 B2
(45) Date of Patent: Dec. 18, 2018

(54) RANDOM MEDIA ACCESS CONTROL ADDRESS COLLISION DETECTION AND AVOIDANCE FOR WIRELESS NETWORK

(71) Applicant: Cisco Technology, Inc., San Jose, CA (US)

(72) Inventor: Tak Ming Francis Pang, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/805,523

(22) Filed: Nov. 7, 2017

(65) Prior Publication Data

US 2018/0077742 A1 Mar. 15, 2018

Related U.S. Application Data

(63) Continuation-in-part of application No. 15/263,870, filed on Sep. 13, 2016.

(51) Int. Cl.
| | |
|---|---|
| *G06F 15/177* | (2006.01) |
| *H04W 76/11* | (2018.01) |
| *H04W 74/08* | (2009.01) |
| *H04L 29/12* | (2006.01) |
| *H04W 8/26* | (2009.01) |

(Continued)

(52) U.S. Cl.
CPC ............ *H04W 76/11* (2018.02); *H04L 1/18* (2013.01); *H04L 61/2038* (2013.01); *H04L 61/2046* (2013.01); *H04L 61/6022* (2013.01); *H04W 8/26* (2013.01); *H04W 48/16* (2013.01); *H04W 74/085* (2013.01)

(58) Field of Classification Search
CPC ..... H04W 76/11; H04W 76/021; H04W 8/26; H04W 48/16; H04W 74/085; H04L 61/6022

See application file for complete search history.

(56) References Cited

U.S. PATENT DOCUMENTS

| | | | |
|---|---|---|---|
| 7,529,851 B1 * | 5/2009 | Haley | H04L 29/12264 709/220 |
| 7,644,200 B2 * | 1/2010 | Sharma | H04L 1/1685 370/235 |

(Continued)

*Primary Examiner* — Jonathan A Bui
(74) *Attorney, Agent, or Firm* — Meunier Carlin & Curfman LLC

(57) ABSTRACT

Presented herein are systems and methods to detect and avoid MAC-address collision of a dynamic MAC address (also referred to herein as a "dynamically assignable MAC address" or a "dynamically allocated MAC address") that is temporarily assigned to a network device in a wireless network. The systems and methods ensure that the dynamic MAC address is unique (and compatible with existing IEEE-802.11) to the wireless network prior to the network device using the address as its network identifier to gain access to the wireless network. The systems and methods involve an initial set of announcements between the network device and the wireless network and, in some embodiments, again when network device roams to another wireless network. The exemplified systems and methods facilitate use of network addresses that are structured according to standard conventions and that are backward compatible with existing MAC-address randomization schemes.

19 Claims, 7 Drawing Sheets

(51) Int. Cl.
*H04W 48/16* (2009.01)
*H04L 1/18* (2006.01)

(56) References Cited

U.S. PATENT DOCUMENTS

| | | | | |
|---|---|---|---|---|
| 7,831,996 B2* | 11/2010 | Dholakia | | H04L 63/08 |
| | | | | 713/168 |
| 8,559,369 B2* | 10/2013 | Barkan | | H04W 12/08 |
| | | | | 370/328 |
| 8,767,526 B1* | 7/2014 | Jagannatharao | | H04L 63/205 |
| | | | | 370/216 |
| 2003/0035442 A1* | 2/2003 | Eng | | H04J 1/00 |
| | | | | 370/486 |
| 2005/0188241 A1* | 8/2005 | Cabezas | | H04L 29/12264 |
| | | | | 714/4.2 |
| 2006/0120317 A1* | 6/2006 | Zheng | | H04L 29/12216 |
| | | | | 370/315 |
| 2008/0186965 A1* | 8/2008 | Zheng | | H04L 12/4633 |
| | | | | 370/389 |
| 2010/0110975 A1* | 5/2010 | Cagenius | | H04L 29/12584 |
| | | | | 370/328 |
| 2014/0119232 A1* | 5/2014 | Gurewitz | | H04W 84/18 |
| | | | | 370/254 |
| 2014/0279862 A1* | 9/2014 | Dietz | | H04L 41/0806 |
| | | | | 707/609 |
| 2015/0204964 A1* | 7/2015 | Hirano | | G01S 5/12 |
| | | | | 370/252 |
| 2015/0381565 A1* | 12/2015 | Thaler | | H04L 61/2046 |
| | | | | 370/389 |
| 2016/0100028 A1* | 4/2016 | Erdmann | | G08C 17/00 |
| | | | | 709/219 |
| 2016/0165523 A1* | 6/2016 | Guo | | H04L 12/6418 |
| | | | | 370/254 |
| 2017/0013449 A1* | 1/2017 | Raman | | H04W 12/06 |
| 2017/0142064 A1* | 5/2017 | Weis | | H04L 61/6022 |
| 2017/0237815 A1* | 8/2017 | Arsenault | | H04W 4/70 |
| | | | | 709/217 |

* cited by examiner

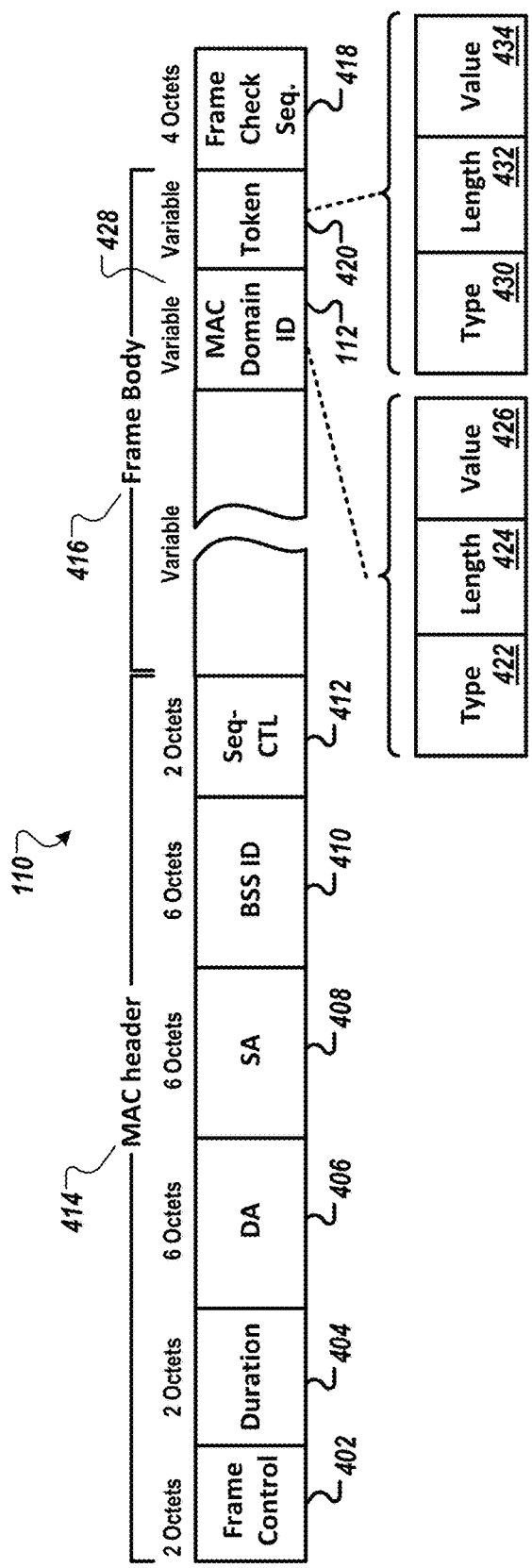
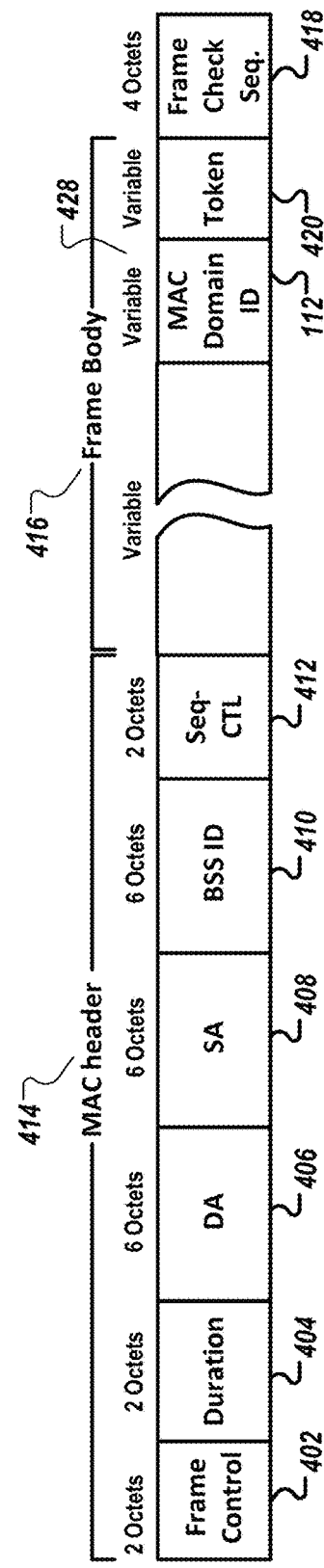
FIG. 4A
FIG. 4B

RANDOM MEDIA ACCESS CONTROL ADDRESS COLLISION DETECTION AND AVOIDANCE FOR WIRELESS NETWORK

RELATED APPLICATIONS

This is a continuation-in-part application of U.S. application Ser. No. 15/263,870, titled "Dynamic Media Access Control Address Allocation and Leasing for Wireless Network", filed Sep. 13, 2016, which is incorporated by reference herein in its entirety.

TECHNICAL FIELD

The present disclosure relates to networking of wireless devices, in particularly, a scheme to detect and avoid collision of MAC addresses temporarily used in a network.

BACKGROUND

Media Access Control (MAC) addresses are unique identifiers associated with a given network device, and each defines a network interface for a network device on a physical or virtual network. MAC addresses are also referred to as burned-in address (BIA), an Ethernet hardware address (EHA), or a physical address. Conventional network devices are permanently assigned, by the device manufacturer, a unique MAC address, which is used as the device's network address for purposes of authentication to gain access to a network.

As the number of network devices continues to grow, so diminishes the number of available MAC addresses that can be used by device manufacturers. Certain manufacturers allow a temporary MAC address to be generated, via a randomization process, as a dynamic MAC address. Such scheme does not safeguard against accidental MAC address collisions and only reduces the likelihood of collisions from occurring. The issue of potential MAC address collision is worsened when the network device roams to a different network, exposing the network device to more network devices and increasing the possibility of a conflict.

MAC addresses can be leased from a pool of addresses. However, to fully enable the maximum use of leased MAC addresses within the pool, additional hardware and/or firmware resources that supports source MAC filtering may be needed to detect and avoid MAC-address collisions. And, in instances in which such collision hardware is implemented, the potential for ACK collision still exists.

BRIEF DESCRIPTION OF THE DRAWINGS

FIG. 4A is a diagram of an example probe request that can be used to transmit a solicitation message or an acknowledgement message that is generated and broadcasted by a client wireless device, as described in relation to FIGS. 1 and 2, in accordance with an illustrative embodiment.

FIG. 4B is a diagram of an example probe response that can be used to transmit a response message that is generated and broadcasted by an access point, as described in relation to FIGS. 1 and 2, in accordance with an illustrative embodiment.

DESCRIPTION OF EXAMPLE EMBODIMENTS

Overview

Figure 1:
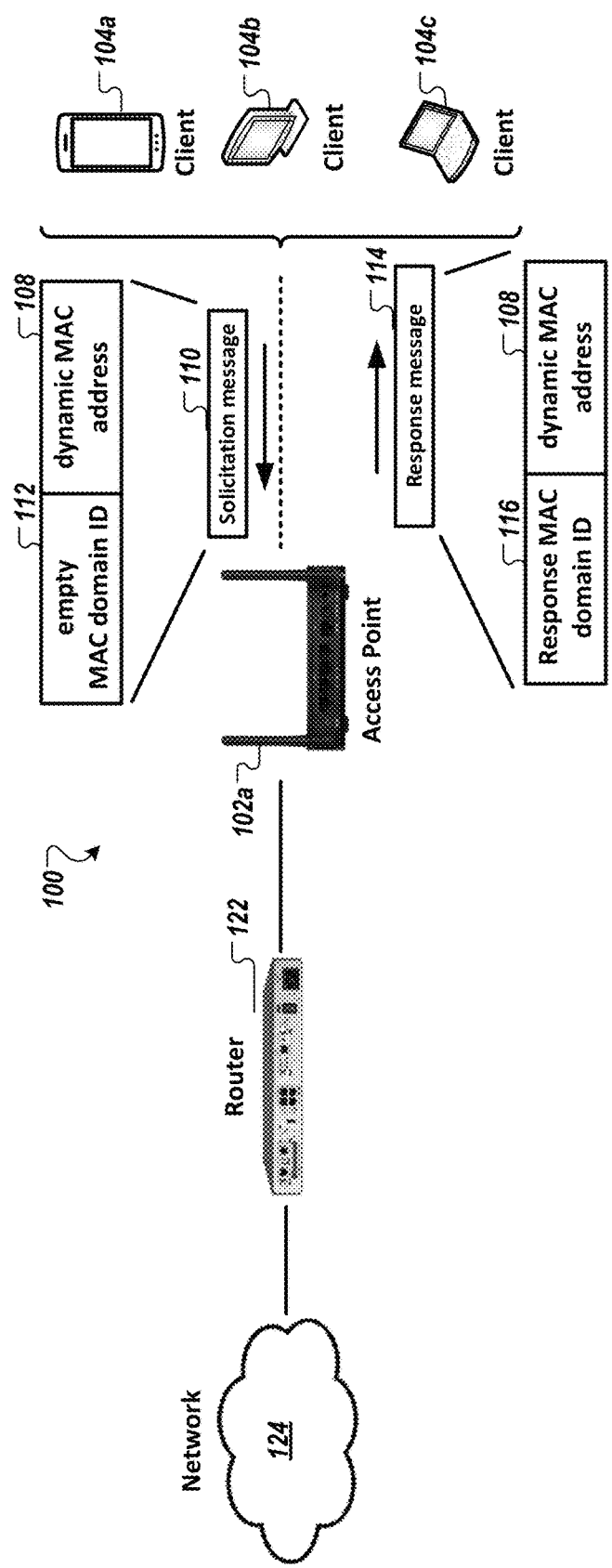
FIG. 1 is a diagram illustrating a network configured to operate an exemplary MAC-address collision detection and avoidance scheme that detects and avoids collision of a randomly generated MAC address generated in the network, in accordance with an illustrative embodiment.

Presented herein are systems and methods to detect and avoid MAC-address collision of a dynamic MAC address (also referred to herein as a "dynamically assignable MAC address" or a "dynamically allocated MAC address") that is temporarily assigned to a network device in a wireless network. The systems and methods ensure that the dynamic MAC address is unique (and compatible with existing IEEE-802.11) to the wireless network prior to the network device using the address as its network identifier to gain access to the wireless network. The systems and methods involve an initial set of announcements between the network device and the wireless network and, in some embodiments, again when network device roams to another wireless network. The exemplified systems and methods facilitate use of network addresses that are structured according to standard conventions and that are backward compatible with existing MAC-address randomization schemes.

The systems and methods comprise a first network device broadcasting, in a solicitation message for a dynamic MAC address to solicit MAC-address collision warnings from all access points that receives the broadcast message, the solicitation message having the dynamic MAC address and a MAC domain identifier (or a transaction identifier) having an empty or null value. An access point having determined a conflict with the candidate dynamic MAC address (e.g., if the access point is already servicing a client (i.e., a second network device) with the same MAC address) will unicast one or more messages in reply to the solicitation message, the reply message will include the dynamic MAC address and a MAC domain identifier associated with the access point. The first network device will only assume the dynamic MAC address as its network address after a predefined of time in which no reply message is received. Indeed, the exemplary MAC-address collision detection and avoidance scheme would allow the network device to work in a network of compliant access points (i.e., running the scheme) and a network of non-compliant access points.

In an aspect, a method is disclosed of operating a network having one or more network devices with dynamic media access control (MAC) addresses. The method includes, in a network, broadcasting, from a network device, a solicitation packet or frame comprising one or more dynamic MAC addresses generated by the network device to connect or to re-associate to the network; in response to receipt from a second network of a packet response device (e.g., an access point) indicating that the one or more dynamic MAC addresses is unavailable, broadcasting, from the network device, i) an acknowledgement frame in reply to the packet response and ii) a second solicitation packet or frame comprising one or more second dynamic MAC addresses generated by the network device to connect or to re-associate to the network, wherein the second network device is configured to re-transmit the packet response until the acknowledgement frame from the network device is received at the second network device; and in response to not receiving the packet response after a pre-defined period of time, transmitting from the network device a request to join a network, wherein the request includes a dynamic MAC address of the one or more broadcasted dynamic MAC addresses as a network address of the network device.

In some embodiments, the solicitation packet or frame comprising the one or more dynamic MAC addresses further includes an empty MAC domain identifier.

In some embodiments, the solicitation packet or frame comprising the one or more dynamic MAC addresses further includes a MAC domain identifier field, and wherein the MAC domain identifier field includes a null value.

In some embodiments the method further includes, following a pre-defined period (e.g., time-out period) to receive from the second network device (e.g., an access point) of the packet response and not having received the packet response, storing at the network device at least one of the broadcasted one or more dynamic MAC addresses as the network address for the network device; and requesting, by the network device, to join the network using the stored dynamic MAC address.

In some embodiments, the method includes, in response to receipt from another network device during the pre-defined period of a packet or frame comprising a MAC address having a same identifier as at least one of the one or more dynamic MAC addresses (i.e., a MAC-address collision event), broadcasting, from the network device, i) the acknowledgement frame and ii) the second solicitation packet or frame.

In some embodiments, the second network device (e.g., an access point) is configured to broadcast (e.g., a unicast message) the packet response following receipt of the packet or frame comprising the one or more dynamic MAC addresses upon a determination that at least one of the one or more dynamic MAC addresses is currently being serviced by the second network device.

In some embodiments, the packet response comprises i) the one or more dynamic MAC addresses and ii) a MAC domain identifier having a value associated with the second network device.

In some embodiments, the MAC domain identifier is a MAC address associated with a controller or is a configurable identifier that is specified by an administrator.

In some embodiments, a third network device currently using a MAC address identical to one of the one or more broadcasted dynamic MAC address is configured to ignore the packet response by not sending the acknowledgement frame.

In some embodiments, the method includes, in response to a roam event of the network device and before a re-association request being sent, broadcasting, by the network device, a third solicitation message with the device's MAC address (e.g., for a response of a collision of the device's MAC address), wherein the third solicitation message further includes a MAC domain identifier; and transmitting the re-association request upon receipt from an access point of a response with a matching MAC domain identifier to that broadcasted in the third solicitation message.

In some embodiments, subsequent packets communicated to the computing device, across the second network device (e.g., access point), are based on the device's stored dynamic MAC address.

In another aspect, an apparatus (e.g., a client) is disclosed. The apparatus includes a processor; and a memory having instructions stored thereon, wherein the instructions when executed by the processor, cause the processor to: broadcast a solicitation packet or frame comprising one or more dynamic MAC addresses generated by the network device to connect or to re-associate to the network; in response to receipt from a second network device (e.g., an access point) of a packet response indicating that the one or more dynamic MAC addresses is unavailable, broadcast i) an acknowledgement frame in reply to the packet response and ii) a second solicitation packet or frame comprising one or more second dynamic MAC addresses generated by the network device to connect or to re-associate to the network, wherein the second network device is configured to re-transmit the packet response until the acknowledgement frame from the apparatus is received at the second network device; and, in response to not receiving the packet response after a pre-defined period of time, transmit a request to join a network, wherein the request includes a dynamic MAC address of the one or more broadcasted dynamic MAC addresses.

In some embodiments, the solicitation packet or frame comprises a MAC domain identifier field, and wherein the MAC domain identifier field includes a null value.

In some embodiments, the instructions when executed by the processor, further cause the processor to, in response to receipt from another network device during the pre-defined period of a packet or frame comprising a MAC address having a same identifier as at least one of the one or more dynamic MAC addresses (i.e., a MAC-address collision event), broadcast i) the acknowledgement frame and ii) the second solicitation packet or frame.

In some embodiments, the instructions when executed by the processor, further cause the processor to, following a pre-defined period (e.g., time-out period) to receive of the packet response from the second network device (e.g., an access point) and not having received the packet response, store at least one of the broadcasted one or more dynamic MAC addresses as the network address; and request to join the network using the stored dynamic MAC address.

In some embodiments, the instructions when executed by the processor, further cause the processor to, in response to a roam event of the apparatus and before a re-association request being sent, broadcast a third solicitation message with the device's MAC address (e.g., for a response of a MAC-address collision of the device's MAC address), wherein the third solicitation message further includes a MAC domain identifier; and transmit the re-association request upon receipt from an access point of a response with a matching MAC domain identifier to that broadcasted in the third solicitation message.

In another aspect, an apparatus (e.g., an access point) is disclosed. The apparatus includes a processor; and a memory having instructions stored thereon, wherein the instructions when executed by the processor, cause the processor to determine for each received solicitation packet or frame comprising the one or more dynamic MAC addresses whether the one or more dynamic MAC addresses is currently being used; and broadcast (e.g., a unicast message) a packet response (e.g., a MAC-address collision indication frame) indicating that the one or more dynamic MAC addresses is unavailable upon a determination that at least one of the one or more dynamic MAC addresses is currently being used by a network device associated with the apparatus.

In some embodiments, the broadcasted packet response comprises a MAC domain identifier, wherein the MAC domain identifier is a MAC address associated with a controller or is a configurable identifier that is specified by an administrator and associated with the network.

In some embodiments, the instructions when executed by the processor, further cause the processor to re-broadcast (e.g., a unicast message) the packet response for a pre-defined period or until an acknowledgement frame is received from another network device (e.g., wherein the acknowledgement frame confirms a MAC-address collision).

In some embodiments, the instructions when executed by the processor, further cause the processor to, in response to a broadcasted third solicitation message during a roam of a network device, wherein the broadcasted third solicitation message comprises a MAC address and a MAC domain identifier, determine if the MAC address in the broadcasted solicitation message matches or not match a stored MAC address associated with the apparatus; and transmit a response to the broadcasted solicitation message if there is no match of a stored MAC address associated with the apparatus, wherein the response include the MAC address and the MAC domain identifier, wherein the transmitted response prompts the network device to re-association to the apparatus during the roam.

Example Embodiment

FIG. 1 is a diagram illustrating a network 100 configured to operate an exemplary MAC-address collision detection and avoidance scheme that detects and avoids collision of a randomly generated MAC address generated in the network, in accordance with an illustrative embodiment.

The network 100 includes one or more access points 102 (shown as access point 102a and access point 102b) in a local network or a wide area network that serves a plurality of client devices 104 (shown as devices 104a, 104b, and 104c) in which one of more of the client device 104 is configured to use a randomly generated MAC address 108 (also referred to herein as a dynamic MAC address) as its network address with the network.

In the exemplary MAC-address collision avoidance scheme, when the client 104 is new to a network in that it has not yet connect to any access point 102, the device 104 is configured to randomly generate one or more dynamic MAC address 108. To prevent the device 104 from using a dynamic MAC address having identifiers that are already being used by another device nearby or being used another device in the network, the exemplary MAC-address collision avoidance scheme includes an initial announcement step of the device 104 broadcasting, to nearby access points 102, a solicitation message 110 that solicits a reply 114 from such access points 102 when there is a MAC-address collision or a potential of one. That is, the reply 114 provides the device 104 with a MAC-address collision warning or indication of the use of the identifier in the dynamic MAC address by another device 104 in the network 100.

The solicitation message 110 includes a MAC domain identifier 112 in a pre-defined MAC domain identifier field that has an initial empty or null value. The solicitation message 110 further includes the dynamic MAC address 108 randomly generated by the network device 104. An empty or null value is transmitted in the field of the message 110 to indicate a solicitation and/or announcement by the new network device 104 for a reply by the access point 102 of whether the dynamic MAC address 108 would have a MAC-address collision with another network device 104 in the network 100. In some embodiments, the solicitation message 110 includes more than one dynamic MAC addresses 108. The field of the MAC domain identifier, when not empty or having a null value, can have a value of a MAC pool identifier or a transaction identifier. The transaction identifier, in some embodiments, is a unique identifier specific to the access point 102 such as MAC address associated with the access point 102, or any identifier generated or assigned to the access point 102. The transaction identifier or MAC pool identifier facilitates identification of the access point that is source of the response message 114 by other devices 104 in the network 100. Further description of the MAC pool identifiers is provided in U.S. application Ser. No. 15/263,870, which has been incorporated by reference herein.

Referring to FIG. 1, in response to receipt of the broadcasted message 108, any access point 102 (and/or any controller of the AP) configured with the exemplary MAC-address collision avoidance scheme and serving a client with a same MAC address is configured to respond with a unicast response message 114. The response message 114 includes the dynamic MAC address 108 matching that of the broadcasted solicitation message 110 and includes a MAC domain identifier 116 (shown as "Response MAC domain ID" 116) having a non-null or non-empty value. The response message 114 serves as a MAC-address collision warning and indication to the device 104 that the dynamic MAC address is not available for use in the network 100 (without causing MAC-address collision with another device). As discussed above, the field of the MAC domain identifier can have a value of a MAC pool identifier or a transaction identifier. In some embodiments of the exemplary MAC-address collision avoidance scheme, each of the access point 102 sending the response message 114 will continue to re-transmit the response message 114 on a periodic basis for a pre-defined timeout period or until an acknowledgement message 118 (not shown—see FIGS. 6 and 7) from the network device 104 is received.

We find that this acknowledgement-based transaction between a requesting client device 104 and the access point 102 is an eloquent, efficient, and reliable way to ensure that the requesting client device 104 has received the response message 114 when there is a MAC-address conflict.

Referring to FIG. 1, in response to receipt of the response message 114 having an identifier in the dynamic MAC address field matching that which was transmitted by the network device 104, the network device 104 would broadcast the acknowledgement message 118 and re-start the process of soliciting for replies for another dynamic MAC address. In some embodiments, the network device 104 is configured to confirm that the response message 114 includes a non-empty or non-null MAC domain identifier 116. Indeed, the presence of a non-empty or non-null MAC domain identifier 116 can be used as an indication that the broadcasted dynamic MAC address 108 is not available.

For other client devices in proximity to the network device 104 or in the same channel as device 104, and already using the same dynamic MAC address, the other client devices would ignore the response message 114 in that the other client device would maintain its network configuration (understanding that another device has unsuccessfully attempted to use a same MAC address as itself). Further, because the other client device did not send out the request message 110, as part of the MAC-address collision avoidance scheme, the other client device will also not transmit an acknowledgement message 118 to a received response message 114.

In some embodiments, when re-starting the process of soliciting for replies for another dynamic MAC address, the network device 104 is configured to randomly generate another dynamic MAC address. In other embodiments, the network device 104 is configured to use a second dynamic MAC address that was previously generated.

In some embodiments, the network device 104 is configured to transmit more than one solicitation message 110 (e.g., two, three, four, five, etc.), each having a different dynamic MAC address 108. In some embodiments, the number of unique dynamic MAC addresses 108 being broadcasted is selectable by a user of the network device 104 (e.g., via the client's wireless application manager). By transmitting multiple solicitation messages concurrently, multiple candidate dynamic MAC addresses can be evaluated in parallel.

In the absence of a response message 114 being transmitted by an access point 102 and received by the network device 104 for a pre-defined period (e.g., a time-out period), the network device 104 will accept the candidate dynamic MAC address for use as its network address. In some embodiments, at this point in the scheme, the network device 104 broadcasts a request to join (i.e., to associate with) the network 100. The request may conform to 802.11 standard—the notable difference is that the dynamic MAC address is used as the network address for the network device 104. In some embodiments, during this pre-defined time-out period, the network device 104 monitors for use of its candidate dynamic MAC address in any other received messages (e.g., in the destination address (DA) and in the source address (SA)).

Referring still to FIG. 1, the access point 102 operatively connects to a switch or router 122 (shown as "router 122") to form a local area network. The switch or router 122 provides connectivity and a wide-area network 124 (e.g., the Internet). Other networking devices may be used in the local area network and the wide-area network, for example, to provide network address translation (NAT) services, firewall, etc.

To further enhance the MAC-address collision avoidance operation, in some embodiments, in addition to sending the response message 114, the access point 102 also broadcasts a second message to other nearby access points 102 to reject a request from a client having the dynamic MAC address when requesting to join the network 100. In some embodiments, the other nearby access points 102 uses the response message 114 as a basis to reject the client having the dynamic MAC address from joining the network 100.

Figure 2:
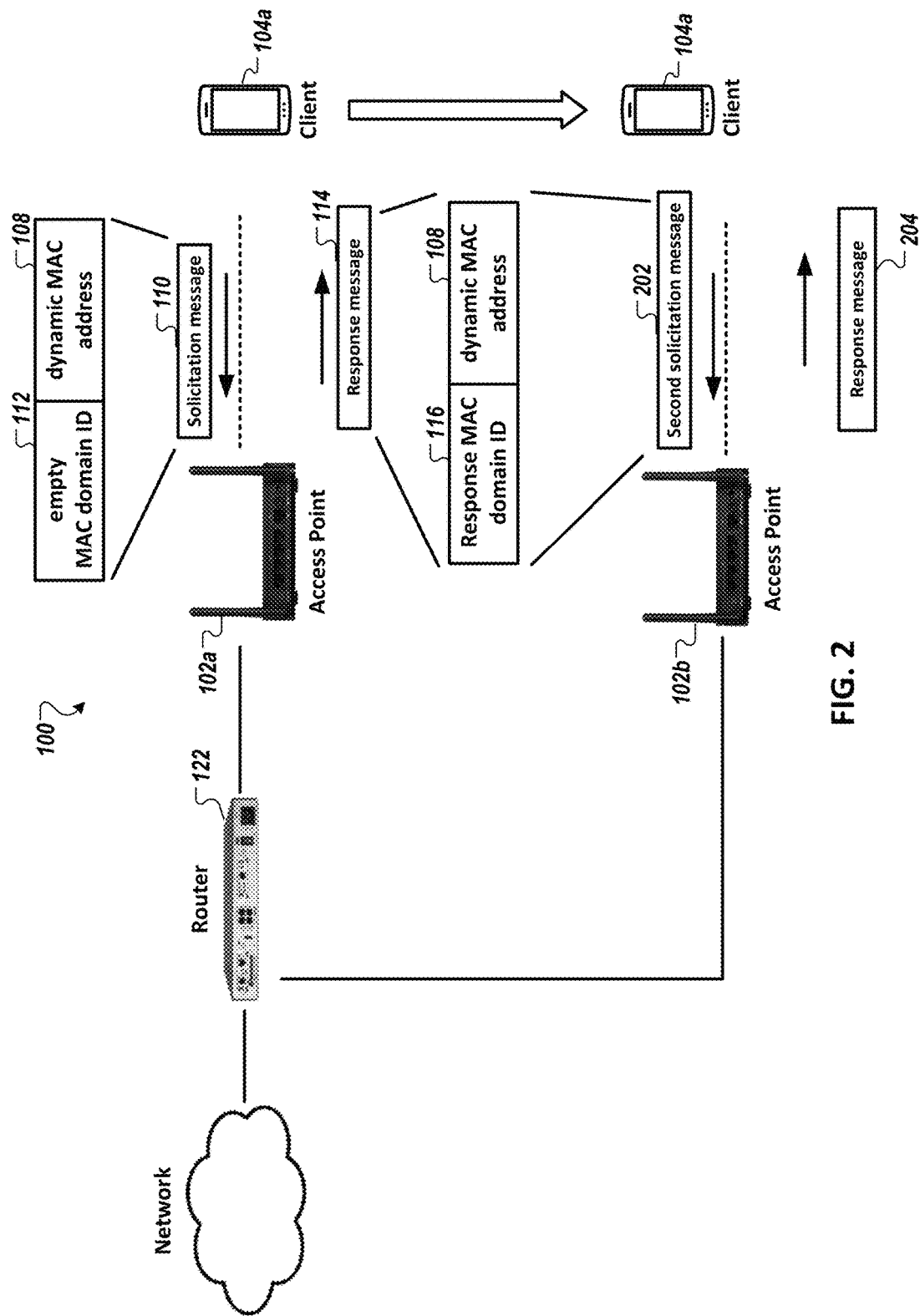
FIG. 2 is a diagram illustrating roaming of a device having a dynamic MAC address as its network address in the network of FIG. 1, in accordance with an illustrative embodiment.

FIG. 2 is a diagram illustrating roaming of a device having a dynamic MAC address as its network address in the network 100 of FIG. 1, in accordance with an illustrative embodiment.

In FIG. 2, during roaming, before initiating an association with a new access point 102b, a client device 104a is configured to transmit a second broadcast solicitation message 202. The second solicitation message 202 includes the MAC domain ID 116, or transaction identifier, received during a prior association. In response to the second solicitation message 202, only access points 102 having matching MAC domain identifier 116, or transaction identifier, would send a response message 204. The matching MAC domain identifier 116 ensures that only an access point 102 to which the network device 104 can roam without a MAC-address conflict would respond.

If the network device 104a receives a response with a mismatching MAC domain identifier or transaction identifier, the network device 104a would replace the current value of the dynamic MAC address with a new dynamic MAC address. The mismatching MAC domain identifier or transaction identifier indicates a MAC-address collision with another network device in the area to which the network device 104a is roaming. Though such scenario can occur, the likelihood of such scenario occurring is low, particularly among sparsely populated independent networks in which the networks have little overlap. The likelihood of such scenario occurring in dense network deployment area is lower as a device's initial request can reach more neighboring access points.

Example Beacon Frame with MAC Domain Identifier and Dynamic MAC Address

Figure 3:
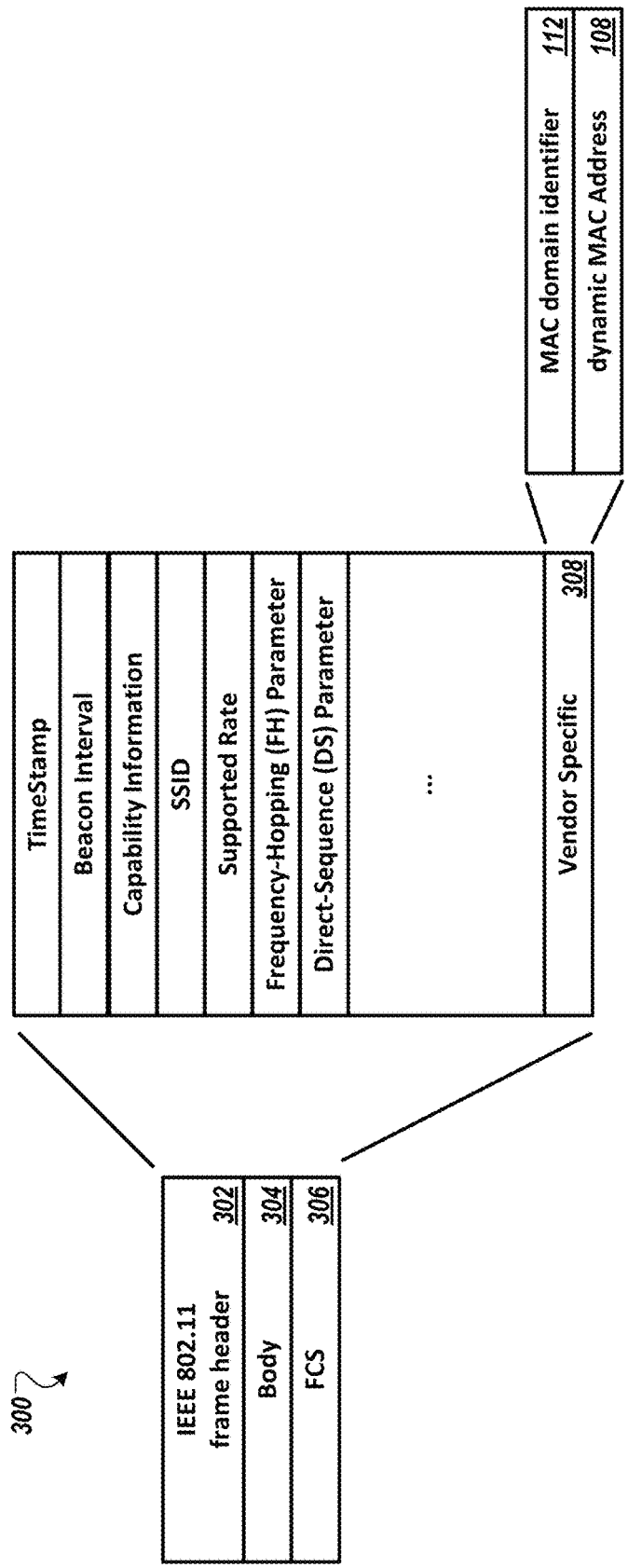
FIG. 3 is a diagram of an example response message as a beacon frame that includes the MAC domain identifier field and the dynamic MAC address field as described in relation to FIGS. 1 and 2 that is broadcasted by the access point, in accordance with an illustrative embodiment.

FIG. 3 is a diagram of an example response message 114 as a beacon frame 300 that includes the MAC domain identifier field 112 and the dynamic MAC address field 108 as described in relation to FIGS. 1 and 2 that is broadcasted by the access point 102, in accordance with an illustrative embodiment.

Beacon frames are one type of management frames in IEEE-802.11-based wireless local area networks (WLANs) and contain all the information about the network. Beacon frames are generally transmitted periodically in an infrastructure Basic service set (BSS) to announce the presence of a wireless LAN. As shown in FIG. 3, the beacon frame 300 includes an IEEE 802.11 frame header 302, a body 304, and a FCS 306. Within the body 304, the beacon frame 300 includes a vendor specific field 308 that includes the MAC domain identifier field 112 (or transaction identifier) and the dynamic MAC address 108.

The MAC domain identifier 112, or transaction identifier, in some embodiments, is a 48-bit address (i.e., 6 octet) that is structured according to MAC-48 namespace or EUI-48 (Extended Unique Identifier-48) namespace as managed by the Institute of Electrical and Electronic Engineers (IEEE). In other embodiments, the MAC Pool identifier or MAC Pool address 114 is a 64 bit address (i.e., 8 octet) that is structured according to EUI-64 namespace as managed by the Institute of Electrical and Electronic Engineers (IEEE). In other embodiments, the MAC Pool address is a 7-octet address. In other embodiments, the MAC Pool address is a 9-octet address. In other embodiments, the MAC Pool address is a 10-octet address. In other embodiments, the MAC Pool address is a user-defined length address that is at least 3 octets in length.

Each dynamic MAC address 108, in some embodiments, is a 48-bit address (i.e., 6 octet) that is structured according to MAC-48 namespace or EUI-48 namespace as managed by the Institute of Electrical and Electronic Engineers (IEEE). In other embodiments, each dynamic MAC address 108 is a 64 bit address (i.e., 8 octet) that is structured according to EUI-64 namespace as managed by the Institute of Electrical and Electronic Engineers (IEEE). In other embodiments, each dynamic MAC address is a 7-octet address. In other embodiments, each dynamic MAC address is a 9-octet address. In other embodiments, each dynamic MAC address is a 10-octet address. In other embodiments, each dynamic MAC address is a user-defined length address that is at least 3 octets in length.

The dynamic MAC address 108, in some embodiments, is a 48-bit address (i.e., 6 octet) that is structured according to MAC-48 or EUI-48. In other embodiments, the dynamic MAC address 108 is a 64 bit address (i.e., 8 octet) that is structured according to EUI-64 standards.

Referring still to FIG. 3, the beacon frame body 304 includes a timestamp field, a beacon interval field, a capability field, a service set identifier (SSID) field, and a support rates field. In some embodiments, the beacon frame body 304 includes optional fields, such as, but not limited to, a frequency-hopping parameter set field, a DSSS parameter set field, a CF parameter set field, an IBSS parameter set field, a traffic indication map (TIM) field, and a country field. Other beacon frame body 304 components is described in the "Part 11: Wireless LAN Medium Access Control (MAC) and Physical Layer (PHY) Specifications," published by the IEEE Standards Association, and is incorporated by reference herein in its entirety.

Probe Request as a Solicitation Message for a Dynamic MAC Address

FIG. 4A is a diagram of an example probe request that can be used to transmit a solicitation message 110 or an acknowledgement message 118 that is generated and broadcasted by a client wireless device 104, as described in relation to FIGS. 1 and 2, in accordance with an illustrative embodiment.

As shown in FIG. 4A, the solicitation message 110 as the probe request includes, among other things, a frame control field 402, a duration field 404, a receiver field 406 (shown as "DA 406"), a sender field 408 (shown as "SA 408"), a BSS ID field 410, and a seq-ctl field 412, that collectively forms a fixed MAC header 414. The probe request as a solicitation message 110 includes a frame body 416 that follows the MAC header 414 and that precedes a frame check sequence 418. The frame body 416 includes, in some embodiments, the MAC domain identifier field 112 (or transaction identifier) and a token 420 as extension fields to the frame body 416. In some embodiments, the MAC domain identifier 112 (or transaction identifier) is structured in the frame body 416 as a TLV ("Type Length Value" field) shown in FIG. 4A as "Type" 422, "Length" 424, and "Value" 426 in which the Value field 426 includes the MAC domain identifier 114 (or transaction identifier). To this end, the length field 424 specifies a length of the MAC domain identifier 112 (or transaction identifier). In some embodiments, the length field 424 specifies the length of the MAC domain identifier 112 (or transaction identifier) in bits. In other embodiments, the length field 424 specifies the length of the MAC domain identifier 112 (or transaction identifier) in octets. The Type field 422, in some embodiments, specifies that the field 428 is a MAC domain identifier field 112. In some embodiments, the MAC domain identifier field 112 comprises the type field 422 and the MAC domain identifier or address (and not a length value).

To resolve or reduce possible MAC-address collision by two different clients trying to reserve a same MAC address, in some embodiments, the probe request includes the token field 420 to identify a particular MAC request and confirmation exchange. As shown in FIG. 4A, the token field 420 includes a type field 430, a length field 432, and a value field 434. In some embodiments, the token value (e.g., used in the value field 434) is generated, as a string, or a hash value of, a user ID of the device. In some embodiments the token value is generated, as a string, or a hash value of, a user ID of the device combined with another parameter, e.g., a time stamp or a randomly generated sequence. Other mechanisms of generating a token may be used, for example, by random selection.

In some embodiments, an access-point probe response is used from the access point 102 as the response message 114 to signal to the client wireless device 104, for example, that a solicitation message 110 for a given dynamic MAC address requested by the client device 104 is not available (e.g., has been assigned to another client device). The access-point probe response, in some embodiments, is structured in accordance with a probe response as shown and described in relation to FIG. 4B. Here, the dynamic MAC address in the probe response is inserted in the receiver (DA) field 406. The dynamic MAC address in the receiver (DA) field 406 is used by the client device 104 to determine that it is the desired recipient of the access-point probe response.

FIG. 4B is a diagram of an example probe response that can be used to transmit a response message 114 that is generated and broadcasted by an access point, as described in relation to FIGS. 1 and 2, in accordance with an illustrative embodiment. As shown in FIG. 4B, the probe response as the response message 114 includes, among other things, a frame control field 402, a duration field 404, a receiver field 406 (shown as "DA 406"), a sender field 408 (shown as "SA 408"), a BSS ID field 410, and a seq-ctl field 412, that collectively forms a fixed MAC header 414. The solicitation message 110 as a probe request includes a frame body 416 that follows the MAC header 414 and that precedes a frame check sequence 418.

Figure 5:
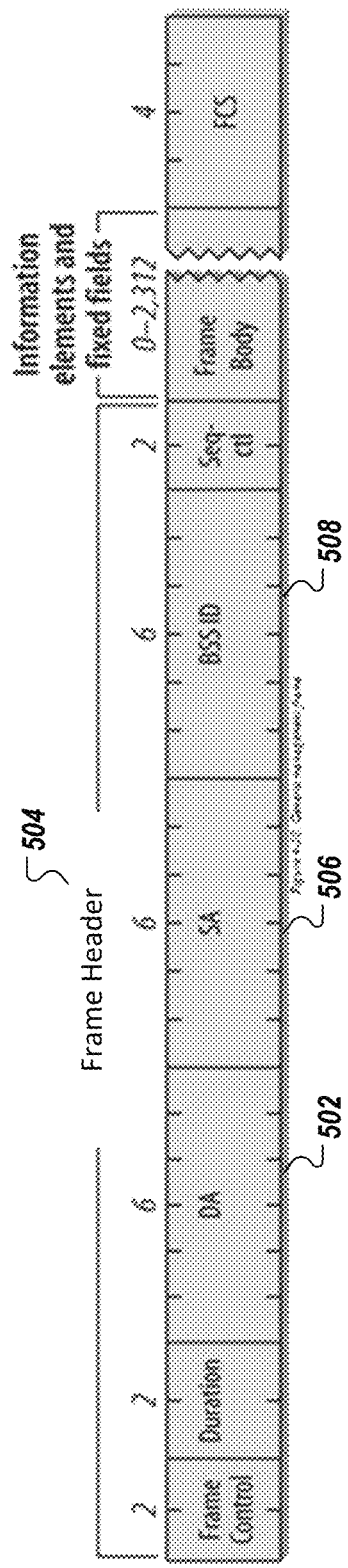
FIG. 5 is a diagram of an example management frame generated by a client wireless device or the access points for use as a solicitation message, a response message, and/or an acknowledgement message, in accordance with another illustrative embodiment.

Management Frame to Request or Response to Assignment of a Dynamically Assignable MAC Address FIG. 5 is a diagram of an example management frame 500 generated by a client wireless device 108 or the access points 102 for use as a solicitation message 110, a response message 114, and/or an acknowledgement message 118, in accordance with another illustrative embodiment. The management frame includes a field to broadcast the MAC domain identifier 112 and the dynamic MAC address 108, as described in relation to FIG. 1.

As shown in FIG. 5, for frames from the access point 102 to the client device 104, the receiver (DA) field 502 in the frame header 504 includes the dynamic MAC address 108, and the sender (SA) field 506 and the BSSID field 508 includes the MAC domain identifier (e.g., the MAC address of the access point 102). For frames from the client device 104 to the access point 102, the receiver (DA) field 502 in the frame header 504 includes the MAC domain identifier (e.g., access point MAC address), and the sender (SA) field 506 includes the dynamic MAC address 108.

Other types of frames as defined in 802.11x can be used by the access point and the network device to communicate to one another the exemplary MAC-address collision scheme. For example, control frames like CTS/ACK ("clear to send/acknowledge") can used as acknowledgement frame 118.

Example Dynamic MAC-Address Collision Avoidance Operation

Figure 6:
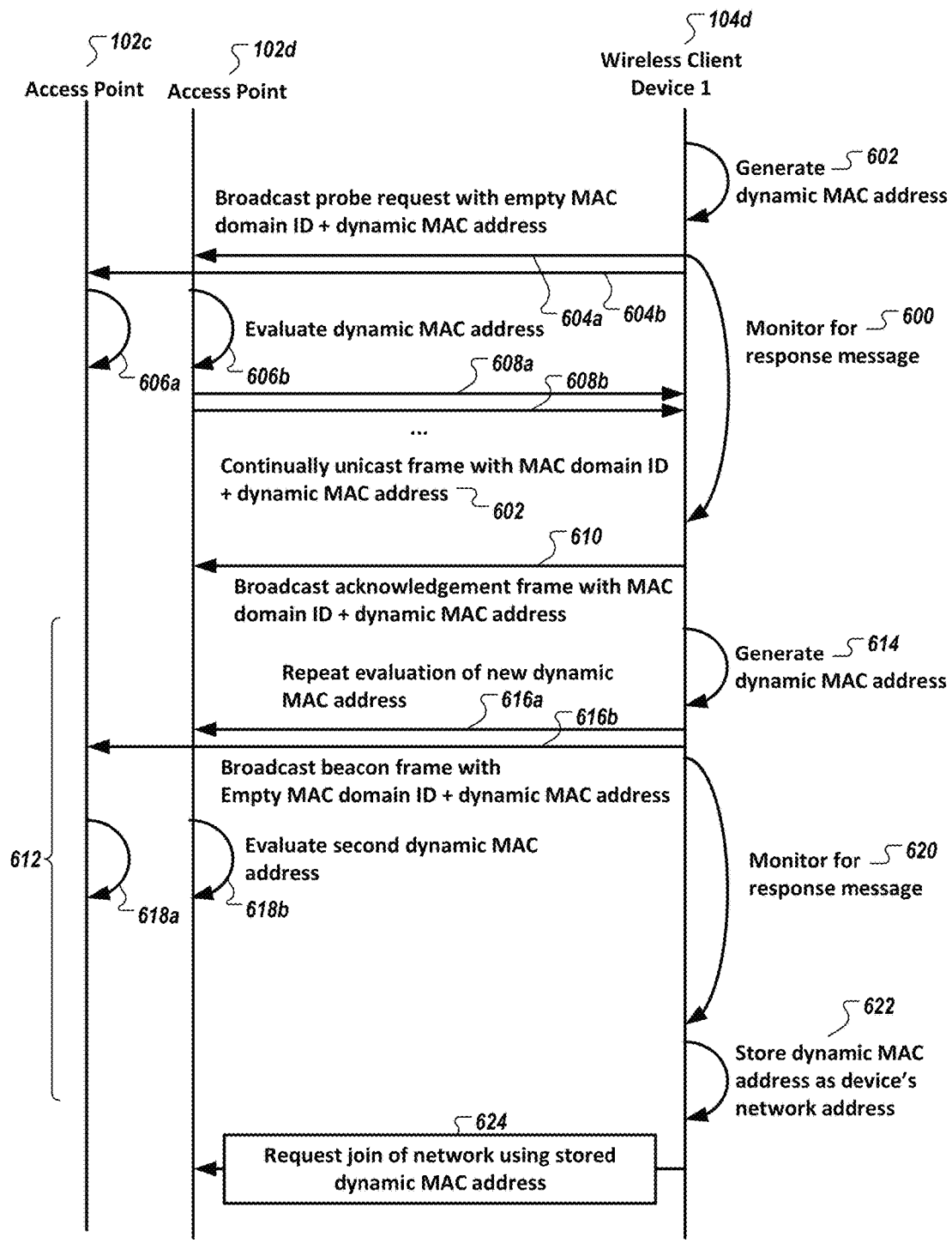
FIG. 6 is a diagram illustrating example MAC-address collision detection and avoidance scheme operation, in accordance with an illustrative embodiment.

FIG. 6 is a diagram illustrating example MAC-address collision detection and avoidance scheme operation, in accordance with an illustrative embodiment. As shown in FIG. 6, an access point 102 (shown as "Access Point 102c" and "Access Point 102d") operate with a client wireless device 104g (shown as "Wireless Client Device 104d" to facilitate the device's use of a randomly generated MAC address.

As described above, in the exemplary MAC-address collision avoidance scheme, when the client device 104d is new to a network 100 in that it has not yet connect to any access point (e.g., access points 102c or 102d), the device 104d is configured to randomly generate (step 602) one or more dynamic MAC address 108.

The client device 104d then broadcasts (shown as steps 604a and 604b) a solicitation packet or frame (shown as probe request) comprising one or more dynamic MAC addresses generated by the client device 104d to one or more access points (in this example, 102c and 102d) to connect or to re-associate to the network 100. The probe request 604a, 604b (as a solicitation message 110) further includes a MAC domain identifier that has an initial empty or null-value field and includes the dynamic MAC address 108 randomly generated by the network device 104d. The empty or null value transmitted as MAC domain identifier in the probe request indicates a solicitation and/or announcement by the device 104d for a reply by nearby access points (e.g., 102c, 102d) of whether the dynamic MAC address 108 would have a MAC-address collision with another network device 104 in the network 100.

In response to receipt of the broadcasted message 108, each of the access points (102c and 102d) evaluates (shown as 606a, 606b, respectively) the message 108, in particular, the dynamic MAC address located therein, to determine whether a same MAC address is currently being used by a network device to which the access point is servicing. The access point (e.g., 102c, 102d) is configured to respond by immediately transmitting (608a) with a unicast response message 114. In this example, access point 102d is shown to have a MAC-address conflict. The response message 114 includes the identifier of the dynamic MAC address 108 and a value in the MAC domain identifier field 112 (shown as "Response MAC domain ID" 116).

As shown in FIG. 6, the access point 102d continues re-sending (shown as 608b) a same response message 114 on a periodic basis for a pre-defined timeout period or until an acknowledgement message 118 (not shown—see FIG. 6) is received (610).

As shown in FIG. 6, following transmission (610) of the acknowledgement message 118, the network device 104d re-starts (612) the process of soliciting for replies for another dynamic MAC address. As shown in this example, the network device 104d randomly generates (614) another dynamic MAC address (or use another dynamic MAC address that was previously generated, e.g., at step 602). The network device 104d then re-transmits (shown as 616a, 616b) the solicitation message 110 and monitors (620) for a response message 104 as described in relation to FIG. 1. Each of the access points 102c, 102d concurrently evaluates (shown as 618b, 618b) the solicitation message 110 to determine whether a MAC-address conflict exists with another device that it is servicing.

As shown in FIG. 6, in the absence of a response message 104 being received by the network device 104d for a pre-defined period (e.g., a time-out period), the network device 104d accepts the candidate dynamic MAC address for use as its network address by storing (622) the dynamic MAC address 108. In some embodiments, the dynamic MAC address 108 is stored in persistent memory. In other embodiments, the dynamic MAC address is stored in non-persistent memory. At this point in the scheme, the network device 104d broadcasts (624) a request to join (i.e., to associate with) the network 100. The request is preferably a conventional 802.11-based association request that includes the dynamic MAC address 108 as the network address for the network device 104d.

Another Example Dynamic MAC-Address Collision Avoidance Operation

Figure 7:
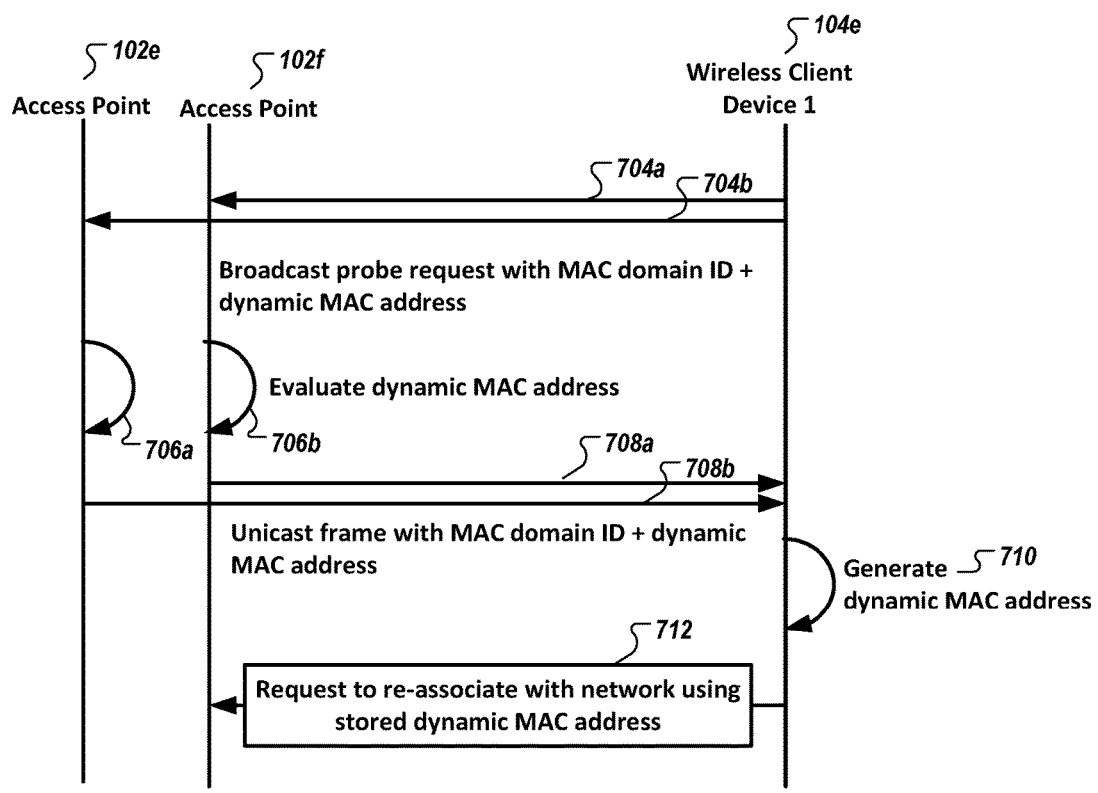
FIG. 7 is a diagram illustrating example MAC-address collision detection and avoidance scheme operation during roaming of a network device from a first access point to a second access point, in accordance with an illustrative embodiment.

FIG. 7 is a diagram illustrating example MAC-address collision detection and avoidance scheme operation during roaming of a network device 102e from a first access point 102e to a second access point 102f, in accordance with an illustrative embodiment.

In FIG. 7, during roaming, before initiating an association with a new access point 102b, the client device 104e is configured to transmit (shown as 702a, 702b) a second broadcast solicitation message 202 (here, shown as being transmitted to access points 102e and 102f). As described in relation to FIG. 2, the second solicitation message 202 includes the MAC domain ID 116, or transaction identifier, received during a prior association.

In response to the second solicitation message 202, the access points (e.g., 102e and 102f) would reply (shown as 708a and 708b) to the message if having a same MAC domain identifier. Because only access points 102 having matching MAC domain identifier 116 or transaction identifier would send a response message 204, the matching MAC domain identifier 116 ensures that only an access point 102 (here in this example, 102e and 102f) to which the network device 104e can roam without a MAC-address conflict would respond. Following receipt of the reply, the network device 104e would select an access point having a matching MAC domain identifier and transmit (712) a request to re-associate with the second access point (here in this example, with access point 102f).

If the network device 104e receives a response (e.g., 708a or 708b) with a mismatching MAC domain identifier or transaction identifier, the network device 104e would replace the current value of the dynamic MAC address with a new dynamic MAC address. The mismatching MAC domain identifier or transaction identifier indicates a MAC-address collision with another network device in the area to which the network device 104a is roaming.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable sub-combination.

In some embodiments, the announcement scheme as described in the exemplary MAC-address collision and avoidance scheme can be used in MAC leasing operations, for example, as described in relation to U.S. application Ser. No. 15/263,870.

By pre-announcing the intention to use a random MAC and get notification from any AP/controller serving the MAC for another client, we can avoid MAC-address collision considered for use by the AP/controller while also completely eliminating the ACK ambiguity or the need for source MAC filtering. Further, with the use of the MAC domain identifier in the request and response, we can distinguish between a new request from non-connecting client and a request from a roaming client. This scheme ensures that a roaming client can continue to use the existing MAC.

What is claimed is:

1. A method of operating a network having one or more network devices with dynamic media access control (MAC) addresses, the method comprising:
   in a network, broadcasting, from a network device, a solicitation packet or frame comprising one or more dynamic MAC addresses generated by the network device to connect to the network;
   in response to receipt from a second network device of a packet response indicating that the one or more dynamic MAC addresses is unavailable, broadcasting, from the network device, i) an acknowledgement frame in reply to the packet response and ii) a second solicitation packet or frame comprising one or more second dynamic MAC addresses generated by the network device to connect to the network, wherein the second network device is configured to re-transmit the packet response until the acknowledgement frame from the network device is received at the second network device;
   in response to not receiving the packet response after a pre-defined period of time, transmitting from the network device a request to join the network, wherein the request includes a dynamic MAC address of the one or more broadcasted dynamic MAC addresses as a network address of the network device;
   in response to a roam event of the network device, broadcasting, by the network device, a third solicitation packet or frame comprising a MAC domain identifier; and
   upon receipt from an access point of a response with the MAC domain identifier, transmitting a re-association request.

2. The method of claim 1, wherein the solicitation packet or frame comprising the one or more dynamic MAC addresses further includes an empty MAC domain identifier.

3. The method of claim 1, wherein the solicitation packet or frame comprising the one or more dynamic MAC addresses further includes a MAC domain identifier field, and wherein the MAC domain identifier field includes a null value.

4. The method of claim 1, further comprising:
   following a pre-defined period to receive the packet response from the second network device and not having received the packet response, storing at the network device at least one of the broadcasted one or more dynamic MAC addresses as the network address for the network device; and
   requesting, by the network device, to join the network using the stored dynamic MAC address.

5. The method of claim 4, comprising:
   in response to receipt from another network device during the pre-defined period of a packet or frame comprising a MAC address having a same identifier as at least one of the one or more dynamic MAC addresses, broadcasting, from the network device, i) the acknowledgement frame and ii) the second solicitation packet or frame.

6. The method of claim 1, wherein the second network device is configured to broadcast the packet response following receipt of the solicitation packet or frame comprising the one or more dynamic MAC addresses upon a determination that at least one of the one or more dynamic MAC addresses is being serviced by the second network device.

7. The method of claim 6, wherein the packet response comprises i) the one or more dynamic MAC addresses and ii) a MAC domain identifier having a value associated with the second network device.

8. The method of claim 7, wherein the MAC domain identifier having the value associated with the second network device is a MAC address associated with a controller or is a configurable identifier that is specified by an administrator.

9. The method of claim 1, wherein a third network device using a MAC address identical to one of the one or more broadcasted dynamic MAC addresses is configured to ignore the packet response by not sending the acknowledgement frame.

10. The method of claim 1, comprising:
    in response to the roam event of the network device and before the re-association request is sent, broadcasting, by the network device, the third solicitation message further comprising the MAC address of the network device.

11. The method of claim 10, further comprising storing, at the network device, the dynamic MAC address of the one or more broadcasted dynamic MAC addresses as a network address of the network device, wherein subsequent packets communicated to the network device, across the second network device, are based on the stored dynamic MAC address.

12. An apparatus comprising:
    a processor; and
    a memory having instructions stored thereon, wherein the instructions when executed by the processor, cause the processor to:
    broadcast a solicitation packet or frame comprising one or more dynamic MAC addresses generated by the network device to connect to the network;
    in response to receipt from a second network device of a packet response indicating that the one or more dynamic MAC addresses is unavailable, broadcast i) an acknowledgement frame in reply to the packet response and ii) a second solicitation packet or frame comprising one or more second dynamic MAC addresses generated by the network device to connect to the network, wherein the second network device is configured to re-transmit the packet response until the acknowledgement frame from the apparatus is received at the second network device;
    in response to not receiving the packet response after a pre-defined period of time, transmit a request to join the network, wherein the request includes a dynamic MAC address of the one or more broadcasted dynamic MAC addresses;
    in response to a roam event of the network device, broadcast a third solicitation packet or frame comprising a MAC domain identifier; and
    upon receipt from an access point of a response with the MAC domain identifier, transmit a re-association request.

13. The apparatus of claim 12, wherein the solicitation packet or frame comprises a MAC domain identifier field, and wherein the MAC domain identifier field includes a null value.

14. The apparatus of claim 12, wherein the instructions when executed by the processor, further cause the processor to:
    in response to receipt from another network device during the pre-defined period of a packet or frame comprising a MAC address having a same identifier as at least one of the one or more dynamic MAC addresses, broadcast i) the acknowledgement frame and ii) the second solicitation packet or frame.

15. The apparatus of claim 12, wherein the instructions when executed by the processor, further cause the processor to:
following a pre-defined period to receive the packet response from the second network device and not having received the packet response, store at least one of the broadcasted one or more dynamic MAC addresses as the network address; and
request to join the network using the stored dynamic MAC address.

16. The apparatus of claim 15, wherein the instructions when executed by the processor, further cause the processor to:
in response to the roam event of the apparatus and before the re-association request is sent, broadcast the third solicitation message further comprising the MAC address of the network device.

17. An apparatus, comprising:
a processor; and
a memory having instructions stored thereon, wherein the instructions when executed by the processor, cause the processor to:
determine for each received solicitation packet or frame comprising one or more dynamic MAC addresses whether the one or more dynamic MAC addresses is currently being used;
broadcast a packet response indicating that the one or more dynamic MAC addresses is unavailable upon a determination that at east one of the one or more dynamic MAC addresses is currently being used by a network device associated with the apparatus;
in response to a broadcasted solicitation message during a roam of the network device, wherein the broadcasted solicitation message comprises a MAC address and a MAC domain identifier, determine if the MAC address in the broadcasted solicitation message matches or does not match a stored MAC address associated with the apparatus; and
transmit a response to the broadcasted solicitation message when there is no match of a stored MAC address associated with the apparatus, wherein the response include the MAC address and the MAC domain identifier, wherein the transmitted response prompts the network device to re-associate to the apparatus during the roam.

18. The apparatus of claim 17, wherein the broadcasted packet response comprises a MAC domain identifier, wherein the MAC domain identifier is a MAC address associated with a controller or is a configurable identifier that is specified by an administrator and associated with the network.

19. The apparatus of claim 17, wherein the instructions when executed by the processor, further cause the processor to:
re-broadcast the packet response for a pre-defined period or until an acknowledgement frame is received from another network device.

* * * * *